United States Patent
Titus

(10) Patent No.: US 10,200,438 B2
(45) Date of Patent: Feb. 5, 2019

(54) TEST FOR PRESERVATION OF DIFFERENTIATED SERVICE IN AN INTERNET PROTOCOL NETWORK

(71) Applicant: Timothy G. Titus, Sunnyvale, CA (US)

(72) Inventor: Timothy G. Titus, Sunnyvale, CA (US)

(73) Assignee: PathSolutions, Inc., Santa Clara, CA (US)

( * ) Notice: Subject to any disclaimer, the term of this patent is extended or adjusted under 35 U.S.C. 154(b) by 22 days.

(21) Appl. No.: 15/408,227

(22) Filed: Jan. 17, 2017

(65) Prior Publication Data

US 2017/0208114 A1 Jul. 20, 2017

Related U.S. Application Data

(60) Provisional application No. 62/279,598, filed on Jan. 15, 2016.

(51) Int. Cl.
*H04L 12/26* (2006.01)
*H04L 29/06* (2006.01)
*H04L 12/851* (2013.01)

(52) U.S. Cl.
CPC ........... *H04L 65/80* (2013.01); *H04L 43/00* (2013.01); *H04L 47/2408* (2013.01); *H04L 65/4084* (2013.01); *H04L 65/608* (2013.01)

(58) Field of Classification Search
CPC ....... H04L 65/80; H04L 45/74; H04L 65/608; H04L 12/26
See application file for complete search history.

(56) References Cited

U.S. PATENT DOCUMENTS

| | | | | |
|---|---|---|---|---|
| 2003/0196118 A1* | 10/2003 | Ushiki | .......... | H04L 29/06 713/152 |
| 2009/0285210 A1* | 11/2009 | Hsu | .......... | H04L 45/00 370/389 |
| 2010/0115072 A1* | 5/2010 | Payyappilly | .......... | H04L 47/10 709/222 |
| 2010/0316045 A1* | 12/2010 | Przybysz | .......... | H04L 47/10 370/352 |
| 2011/0149775 A1* | 6/2011 | Lee | .......... | H04L 41/147 370/252 |
| 2012/0014377 A1* | 1/2012 | Joergensen | .......... | H04L 43/0852 370/352 |
| 2012/0026869 A1* | 2/2012 | Wang | .......... | H04L 41/5003 370/230 |
| 2013/0060931 A1* | 3/2013 | Kavanagh | .......... | H04L 43/026 709/224 |

(Continued)

*Primary Examiner* — Chi Ho A Lee
(74) *Attorney, Agent, or Firm* — GSS Law Group

(57) ABSTRACT

Measuring a quality of service in an Internet protocol network includes forming no more than one echo request packet in an originating device; transmitting the echo request packet to a destination device; swapping the source and destination addresses in the received echo request packet to form an echo reply packet without allocating memory for a new packet; receiving at the originating system the echo request packet repurposed as the echo reply packet; comparing a DSCP value in the echo request packet to a DSCP value in the echo reply packet; and when the DSCP values from the two packets are the same, asserting a prediction that the network will deliver a preferred quality of service for a streaming message service.

18 Claims, 3 Drawing Sheets

(56) References Cited

U.S. PATENT DOCUMENTS

| | | | |
|---|---|---|---|
| 2016/0142326 A1* | 5/2016 | Akiyoshi | H04L 45/586 370/236 |
| 2016/0192233 A1* | 6/2016 | Sarker | H04L 47/11 370/236 |
| 2018/0048567 A1* | 2/2018 | Ignatchenko | H04L 43/0864 |

* cited by examiner

TEST FOR PRESERVATION OF DIFFERENTIATED SERVICE IN AN INTERNET PROTOCOL NETWORK

FIELD OF THE INVENTION

Embodiments are related to methods for measuring quality of service (QOS) for messages sent from an originating device to a destination device at least two intervening network appliances in an Internet Protocol (IP) network.

BACKGROUND

Two or more communications-enabled devices may exchange messages with one another over an Internet Protocol (IP) network. A message may pass through several routers or other network appliances in the IP network from a sending device to a recipient device. The sending device may be referred to as the source device or the originating device. The recipient device may be referred to as the receiving device or the destination device.

Each message may be segmented into many data packets. Each data packet may include many data fields, for example a header with a source address, a destination address, data fields related to quality of service and other parameters, and a data payload representing message contents such as text data, audio data, video data, instructions to be processed by a destination device, measured or calculated values, and so on. The individual data packets from which a complete message is formed may not all be subjected to the same processing by network appliances in the IP network. Some data packets may follow network different paths from the originating device to the destination device compared to other data packets from the same message. Some data packets may be delayed relative to other packets, possibly causing data packets to arrive at the destination device in a different order than the order in which they were sent, or with varying time delays between received data packets. Data packets may take many hops between the source and destination devices, possibly passing through many network appliances such as routers, bridges, switches, or other network-attached devices. At each hop across a router or other network appliance, a packet received by the network appliance may be retransmitted accurately and efficiently or may instead be dropped, delayed, or have data in the packet header omitted or altered. Dropped packets may have been lost, expired, or prevented from making more than a selected number of hops.

Some messages are relatively insensitive to dropped or delayed packets. When dropped or delayed packets are detected, retransmission of the packets may be requested or error correction schemes may be applied to fill in missing data for reconstruction of the originally transmitted message. For example, a message corresponding to a text message, document, or digital photograph may be sent from a source system to a destination device with some packets delayed or retransmitted, possibly causing a delay in the time when the reconstructed message is available on the destination device, but otherwise not impairing the accuracy, utility, or aesthetic value of the reconstructed message at the destination.

While some messages may be insensitive to dropped or delayed packets, other messages are preferably received without variations in time delays between packets, dropped packets, or alteration of data values in packet headers or payloads. For example, dropped, delayed, or altered packets may decrease the quality of video images for streaming video services, decrease sound quality for streaming audio services, or interfere with accurate real-time monitoring and control of industrial processes. For monitoring and control applications, dropped, altered, or delayed packets may lead to poor process results, higher process costs, damage to equipment, or unsafe operation.

A packet header may include a code value corresponding to a request that routers and other network appliances intervening between the source and destination devices provide differentiated service to the packet. Differentiated service may include, for example, retransmitting a received packet at a high priority compared to other packets, perhaps without alteration of packet contents or added time delays. A code value representing priority for data packet processing may be referred to as a Differentiated Services Code Point (DSCP) value. DSCP values may be assigned in accord with standards for IP networks and may represent different categories or priorities against dropped or delayed packets. For example, a DSCP value of "0" (zero) may be included in a header for a packet with relatively low priority. A low priority may be assigned to a packet that may be delayed without impairing the utility or perceived quality of the reconstructed message. A different DSCP value may be assigned to a packet that to be transmitted at a higher priority. A network appliance capable of responding to the DSCP value may delay retransmitting a packet with low priority, for example a packet with a DSCP value of "0", to provide a faster response to another packet with higher priority.

Some network appliances, for example some legacy routers operating in contemporary IP networks, do not include the capability of detecting or responding to a QOS-related field such as a DSCP value in a packet header. Some network appliances may not provide differentiated service in response to DSCP values in received packets. Some network appliances may omit DSCP values from retransmitted packets. Network appliances that do not provide differentiated service may cause dropped or delayed packets in the IP network. When a network appliance strips a DSCP value from a retransmitted packet, other network appliances receiving the altered packet may not provide differentiated service even if the other appliances have the capability to do so.

Various network utilities have been available for monitoring, testing, and troubleshooting messaging services in an IP network. Ping, an example of a network utility, may generate messages in accord with the Internet Control Message Protocol (ICMP). Ping transmits an echo request packet from an originating device, also referred to as the source device, to a specified destination device. An echo request packet may also be referred to as a Ping packet. When the echo request packet is received by the destination device at an IP address specified in the echo request packet's header, the destination device may respond by sending an echo packet back to the IP address for the source device. Receiving an echo packet in response to an echo request packet enables the source device to confirm that a communication pathway existed to the destination device at the time Ping was executed.

A source device may use a response from another device to measure network parameters related to QOS, for example a time interval from sending a Ping message until an echo packet returns. An echo packet may take the form of an echo reply, an ICMP message generated in response to an echo request. The measured time interval from transmission of the Ping message from the originating device to receipt of the echo packet by another device may be referred to as the travel time. Ping may be used by a source system to determine that an echo packet was never received or was not received within a specified time limit, enabling the source system to detect dropped packets or predict a rate of packet loss. Ping may further show a statistical summary of response messages and may include one or more results such as the response packets received, the minimum, maximum and mean round-trip times, and the standard deviation of the mean.

Traceroute is another example of a network utility. Traceroute captures information about an echo request packet sent from a source device, for example a host computer system, to a destination device, for example a Voice Over Internet Protocol (VOIP) telephone, an Internet-enabled television, or another computer system such as an Internet host computer. Information returned by Traceroute may include a count of how many hops occurred from to the destination from the source, a measurement of time for each hop, the address of each network device included in a communications path from the source to the destination, and other data.

Traceroute may be used to send echo request packets with low hop count fields. The hop count field value specifies a maximum number of hops the packet may be subjected to before the packet is stopped. If the echo request packet's hop count decrements to zero, the packet is terminated and a return packet indicating that the echo request packet terminated is sent from the network appliance that received the packet to the source system for the traceroute. If the echo request packet arrives at the destination before the hop count decrements to zero, the destination device sends an echo packet back to the source system. The travel time for a packet with a hop count of one gives the travel time across the first hop. The travel time for a packet with a hop count of two gives the travel time across the first and second hop. Subtracting the travel time for a hop count of one from the travel time for a hop count of two gives the travel time across the second hop. Successive hop count packet travel time measurements may be used to determine how many hop counts are required to send a message from the source to the destination, and the travel time across each hop.

Some devices connected to an IP network respond to a received Ping message efficiently, swapping the destination address and the source address in the received packet, then retransmitting the packet back to the originating device without other alteration of the packet's payload or header fields. An efficient response minimizes the number of processor cycles and amount of memory consumed in the destination device and reduces delays on other messages queued for transmission from the destination device.

Other devices respond to a Ping message inefficiently, taking many clock cycles for a local processor in the destination device to allocate memory for a new packet, copy the contents of the received echo request packet to the new packet with the source and destination addresses swapped, and transmit the new packet as the response to the originating device and then destroy the echo request packet received from the originating device. An inefficiently created echo reply packet may not include every data value from the echo request packet. Some fields may be omitted or values may be altered. For example, the DSCP field in an echo request packet or other received packet may not be copied to an echo packet or other retransmitted packet. The time required to complete the copying process may cause time delays for echo packets or for other message packets queued for transmission.

Alternatives to Ping for evaluating IP network performance include, for example, operating a remote agent on a destination device to determine parameters related to QOS. A remote agent, possibly implemented as computer software executing on a destination device, may exchange messages with software executing on the originating device to measure, estimate, or predict network time delays, hop times, packet transmission rates, packet loss rates, and other parameters which may affect the quality or utility of subsequent messages. For example, a remote agent executing on an Internet-enabled television may interact with an originating device for a video streaming service to measure values related to quality of service such as rates at which data packets are received, counts of dropped packets, variations in time intervals between received packets, and other factors, any of which may impact the perceived quality of video images viewed on the television. The originating device may send messages to the remote agent at increasing packet rates until the remote agent reports an unacceptable number of dropped or delayed packets.

The originating device may modify transmitted data in response to information received from a remote agent, for example by reducing a rate of packet transmission, reducing a number of packets transmitted, changing digital filter parameters or data compression parameters, or other modifications of transmitted data that may reduce resolution or refresh rates in displayed images. Similarly, a remote agent on a VOIP telephone may request a reduction in a number of transmitted data packets from an originating device in response to a measurement of available network bandwidth. A reduction in the number of data packets in a VOIP message stream may correspond to lower audio resolution or lower audio dynamic range for voice communication.

Some destination devices may not be capable of hosting a remote agent suitable for making preferred quality of service measurements. On some networked devices, security measures may interfere with operation of a remote agent. Or, a remote agent installed on a destination device may be incompatible with software executing on an originating device.

SUMMARY

An example of a method for measuring a quality of service in an Internet protocol network includes forming one echo request packet in an originating device; transmitting the echo request packet to a destination device through the Internet protocol network communicatively coupling the originating device to the destination device; receiving the echo request packet at the destination device; modifying the received echo request packet in the destination system to form an echo reply packet; receiving the echo reply packet at the originating device; comparing a value for a Differentiated Services Code Point (DSCP) value in the echo request packet to a value for the DSCP value in the echo reply packet; and when the DSCP value in the echo request packet is equal to the DSCP value in the echo reply packet, asserting that Differential Service is preserved in the Internet protocol network from the originating device to the destination device.

A first DSCP value may be assigned to a first echo request packet; a second DSCP value may be assigned to a second echo request packet; the first and second echo request packets may be sent to the destination device; a first echo reply packet may be formed in response to the first echo request packet; a second echo reply packet may be formed in response to the second echo request packet; and the originating device may compare a DSCP value in the first echo reply packet to a DSCP value in the second echo reply packet.

The example of a method may further include any one or more of the following, singly or in any combination: transmitting no more than one echo request packet from the originating device to the destination device to determine that Differential Service is preserved; forming no more than one echo request packet in the origination device to determine that Differential Service is preserved; and asserting that the Internet protocol network operates with a preferred quality of service for a streaming message service.

The example of a method may further include asserting that Differential Service is not preserved in the Internet protocol network when a value for Differentiated Services Code Point in the echo request packet is not equal to a value for Differentiated Services Code Point in the echo reply packet, and may further include asserting that the Internet protocol network is not operating with a preferred quality of service for a streaming message service.

The example of a method embodiment may further include identifying a location in an IP network where a DSCP value is not preserved.

The example of a method may further include any one or more of the following, singly or in any combination: forming the echo reply packet by swapping a source address and a destination address in the echo request packet; forming the echo reply packet without allocating memory in the destination device for another data packet; predicting a preferred quality of service for messages representative of Voice Over Internet Protocol; predicting a preferred quality of service for messages representative of streaming audio; predicting a preferred quality of service for messages representative of streaming video; predicting a preferred quality of service for messages representative of control of an industrial process; predicting a preferred quality of service for messages representative of data file transfer; and predicting a preferred quality of service for messages representative of video on demand.

DRAWINGS

DESCRIPTION

Figure 1:
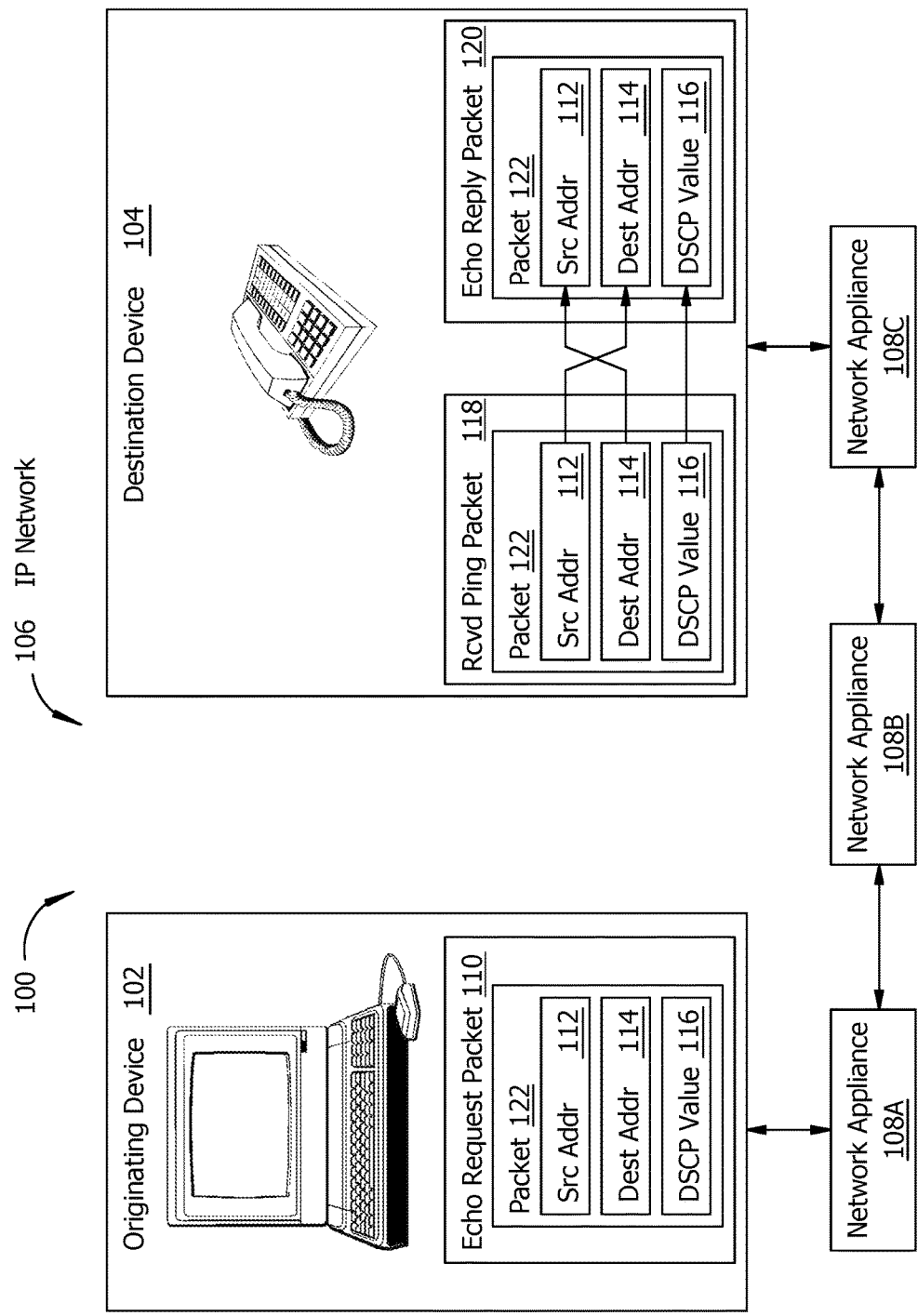
FIG. 1 is a simplified block diagram of an example of an IP network in accord with an embodiment.

An example of a method embodiment for predicting Quality of Service (QOS) in an Internet Protocol (IP) network includes testing the IP network for differentiated service between an originating device and a destination device. When differentiated service is found to be operating in all network appliances participating in the exchange of messages between the source and destination devices, the method may assert that the IP network is operating with a preferred QOS for a streaming message service. When the example method embodiment determines that differentiated service is not preserved in the IP network, the example of the method for predicting QOS may assert that the IP network is not operating with the preferred QOS for a streaming message service. An IP network that is not operating with the preferred QOS for a streaming message service may result in lost data, unwanted timing variations, or loss of data resolution in messages reconstructed at the destination device, possibly impairing the aesthetic quality or utility of the reconstructed messages. When a method embodiment determines that a preferred QOS is not provided everywhere in an IP network from an originating device to a destination device, the method may include finding a location in the IP network where a DSCP value is not preserved and QOS is decreased. The location may correspond to a network appliance which does not preserve a DSCP value during a hop across the appliance.

The example of a method embodiment tests whether or not a DSCP value in an echo request packet sent from an originating device is included without alteration or deletion in the echo packet returned to the originating device from a specified destination device. When the DSCP value in the echo packet and the DSCP value in the echo request packet both correspond to a same value, the DSCP value may be said to be preserved. When the DSCP value is preserved, the example of a method embodiment may assert that the source device, destination device, and all intervening network appliances in the IP network are operating to provide differentiated service for streaming message services such as VOIP, Video On Demand (VOD), streaming audio, streaming video, and for time-sensitive communications such as real-time monitoring and control of industrial processes.

The examples of a method embodiment are effective for determining whether or not differentiated service is preserved in an IP network by the exchange of one, and preferably no more than one, data packet between an originating device and a destination device. The availability of differentiated service may be tested end-to-end, that is, from the originating device to the intended destination device for streaming messages or other messages, and from the originating device to any selected network appliance in the IP network. Examples of a method embodiment operate in distinct contrast to other methods which exchange more than one, and sometimes many, data packets to assess IP network performance. For example, other methods may use multiple Ping commands or remote agents exchanging multiple messages or messages with more than one data packet to determine IP network suitability for streaming message services.

FIG. 1 illustrates a block diagram of an example of an IP network in accord with a method embodiment 100 for predicting QOS in an IP network. An originating device 102, also referred to herein as a source device or a source system, is connected for data communication over an IP network 106 with a destination device 104. A destination device may also be referred to herein as a destination system 104. The IP network 106 includes at least two, and possibly many, intervening network appliances (108A, 108B, 108C) to couple a network for the originating device 102 to the network for the destination device 104. More than one type of network appliance 108 may be included in the IP network 106. Each device coupled to the IP network 106 may include a unique IP address which may be used as a source address or a destination address in a packet header.

Examples of a network appliance include, but are not limited to, a router, a bridge, a brouter, and a switch. Examples of the originating device 102 and the destination device 104 include, but are not limited to, a host computer system implemented as a hardware device, a VOIP phone, an Internet-enabled television, an Internet-enabled audio playback system, an Internet-enabled video disk player, a smart phone, a process control system, a building security system, remotely operable process components such as valves, pumps, fans, electric power inverters, electrical switching devices in electric power generating systems and electric power distribution systems, and other devices capable of connection to a communications network. A VOIP phone in accord with an embodiment may be implemented as a stand-along hardware device or may alternately be implemented as a software program running on computer hardware.

FIG. 1 further illustrates an example of a destination device 104 efficiently forming an echo reply packet from a received echo request packet. In the example of FIG. 1, the originating device 102 may form a packet 122 to be used as an echo request packet 110. The same packet 122 will be returned from the destination system as the echo reply packet as will be explained in more detail below. The packet 122 includes a source address 112, a destination address 114, and a DSCP value 116. The originating device 102 preferably transmits one, and preferably not more than one, echo request packet 110, corresponding to the packet 122, through the IP network 106 to the destination device 104 at the IP address in the destination address field 114 in the echo request packet 110. The destination device 104 may receive the one echo request packet 110 after the packet 122 has hopped at least twice, and perhaps many times, through intervening network appliances (108A, 108B, 108C).

After receiving the echo request packet 110, represented in FIG. 1 by a received Ping packet 118, the destination device 104 may respond efficiently to the echo request from the originating device by swapping the value in the source address field 112 with the value in the destination address field 114 in the received Ping packet to repurpose the received packet 122 for use as the echo reply packet 118. Other fields in the received Ping packet 118, including the DSCP value 116, preferably remain intact and unaltered and the same packet 122, modified only by swapping source and destination addresses, returns to the originating device as the echo reply packet 118. By operating directly on the received packet 122, the destination device 104 avoids using time and memory resources for copying received packet contents into a new packet.

A method embodiment may determine a network appliance in an Internet protocol network where a DSCP value is not preserved. For example, a traceroute command may indicated which network appliances (108A, 108B, 108C) are intervening in a communications path from an originating device 102 to a destination device 104 as suggested in the example of FIG. 1. Each intervening network appliance may be tested for preservation of the DSCP value in a series of incremental paths formed from the originating system to a selected network appliance, each incremental path including a subset of the total number of network appliances in the IP network 106. Network appliances may be tested for preservation of the DSCP value in the sequential order discovered with the traceroute command, for example in the order of FIG. 1: 108A, then 108B, then 108C. Each incremental path may include one more network appliance than the number of network appliances in the most recently evaluated path. A selected network appliance may be addressed as the destination device and DSCP preservation evaluated from the originating system to the selected network appliance. The example method embodiment may report the number of hops from the originating device over which DSP value is preserved. When a method embodiment discovers that a selected network appliance is not preserving the DSCP value, a network operator may take remedial action to reconfigure, repair, or replace the network device that does not preserve DSCP value.

In FIG. 1, the examples of an echo request packet 110, received Ping packet 118, and echo reply packet 120 are identified as a same packet 122 to emphasize that there is only one packet, in contrast to an inefficient method for forming an echo reply by copying values from a received packet to another, separately formed packet. After the modified packet 122 is returned to the originating device 122, the example method embodiment determines whether or not differentiated service is preserved in the IP network 106, as will be explained in more detail with regard to FIG. 2.

A method embodiment may simulate the effects of network congestion on a prediction of QOS for a streaming message service. For example, an echo request packet including a nonzero DSCP value, also referred to as a DSCP tagged packet, may be transmitted in a longer transmission including many untagged packets, where an untagged packet includes a DSCP value of zero or alternatively omits a DSCP value from the packet. The plurality of untagged packets simulate the effects of congestion in the IP network. An embodiment may include assigning a nonzero DSCP value to an echo request packet.

A method embodiment may simulate the effects on a prediction of QOS for an IP network for streaming messages having different priorities. For example, it may be preferable to assign a higher priority to packets representing VoIP communications than packets representing streaming of music for entertainment purposes, packets transmitted as part of a data file transfer, or packets with other, lower priorities than VoIP. A first DSCP value may be assigned to a first echo request packet, a second DSCP value may be assigned to a second echo request packet, and the first and second echo request packets may be sent to the destination device. The destination device may return a first echo reply packet in response to the first echo request packet and a second echo reply packet in response to the second echo request packet; and the originating device may compare a DSCP value in the first echo reply packet to a DSCP value in the second echo reply packet to determine if the IP network maintains a preferred QOS for the higher priority packet in the presence of packets with a specified lower priority. Transmission of echo request packets with different DSCP values representing different message priorities may optionally be performed in combination with transmission of untagged packets.

Figure 2:
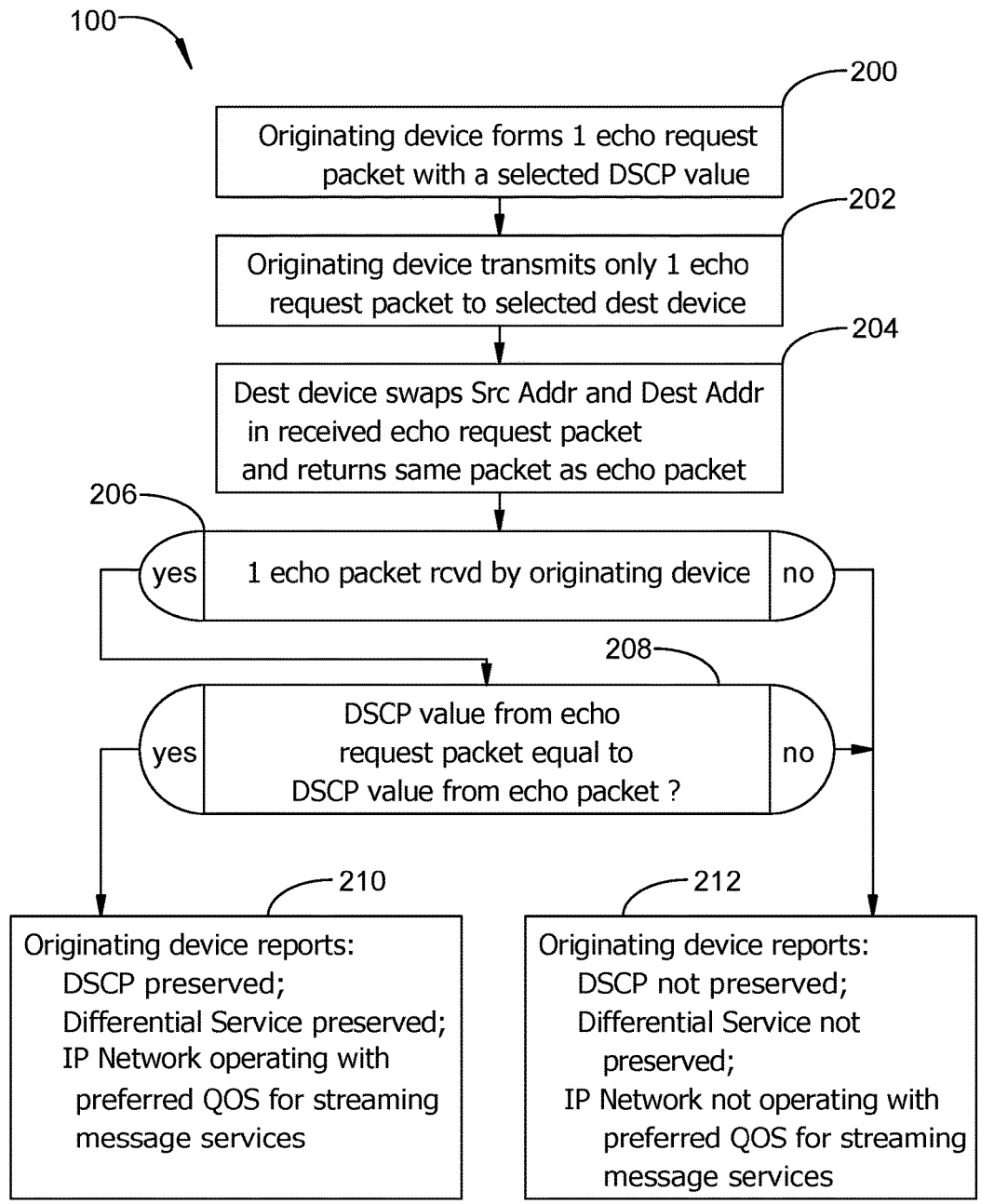
FIG. 2 is a diagram showing examples of steps for determining when a DSCP value in an echo request packet has been preserved in an echo reply packet.

FIG. 2 shows examples of steps in accord with a method embodiment 100 performed by the originating device 102 to determine if differentiated service and/or a preferred quality of service for streaming messages is provided between selected originating and destination devices in the IP network 106.

At step 200, the originating system forms one, and preferably no more than one, echo request packet with a selected DSCP value in the packet header. The echo request packet may be referred to as a Ping packet.

At step 202, the echo request packet 110 is transmitted from the originating device 102 to the selected destination device 104 through network appliances 108 on the communication path in the IP network 106 between the originating and destination devices.

At step 204, the destination device 104 (Dest device) receives the echo request packet 110 from the originating device 102, swaps the source address 112 (Src Addr) with the destination address 114 (Dest Addr) to form an echo reply packet 120, and returns the echo reply packet to the originating device. The destination device operates directly on the received packet 122 to form the echo reply packet 120, without copying or modifying other fields in the received packet 122.

At step 206, the originating device 102 waits for the echo request packet 110 to be modified and returned as the echo reply packet 120 from the destination device at the destination address 114 in the echo request packet. If the originating device receives the echo reply packet 120, the example of a method embodiment continues at step 208. If the echo reply packet 120 is not received by the originating system, the example of a method embodiment continues at step 212.

At step 208, the originating device 102 compares the DSCP value 116 in the echo reply packet 120 to the DSCP value in the header of the echo request packet 110. When the compared DSCP values are equal to one another, the example of a method embodiment continues at step 210. When the compared DSCP values are not equal to one another, for example when the numerical values differ from one another or when the echo reply packet 120 does not include a DSCP value 116, the example of a method embodiment continues at step 212.

At step 210, the originating device 102 may issue a report asserting that the DSCP value is preserved. The originating device 102 may optionally assert that differentiated service is available from the originating device 102 to the destination device 104, and may further optionally assert that the IP network 106 is operating in accord with a preferred quality of service for a streaming message service. After performing step 210, the example of a method may terminate.

At step 212, the originating device 102 may issue a report asserting that the DSCP value is not preserved, i.e. the DSCP value has been deleted or altered, and may optionally assert that differentiated service for streaming message services is not available in the IP network 106 from the originating device 102 to the selected destination device 104. After performing step 212, the example of a method may terminate.

Figure 3:
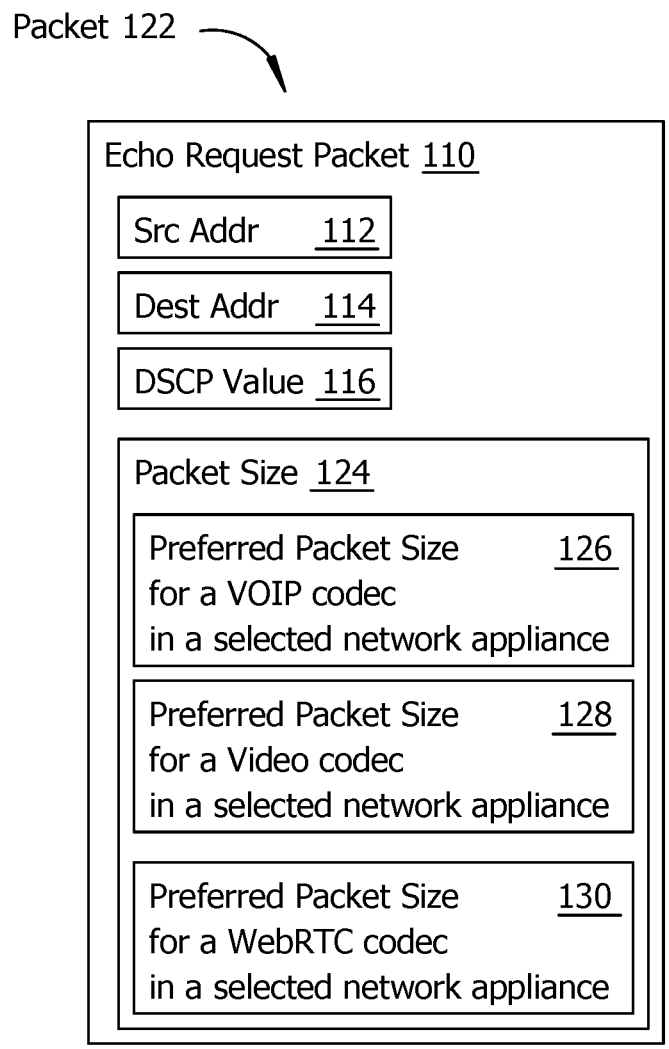
FIG. 3 shows an example of optional alternative packet size selections for testing for preservation of a DSCP value by a method embodiment.

An embodiment may predict QOS in a network for data packets of different sizes. A packet size parameter in an echo request packet 110 may be set to a value corresponding to a preferred packet size in a selected network appliance as suggested in the example of FIG. 3. The packet size 124 in an echo request packet 110 may match, for example, a preferred packet size 126 for a VOIP codec in a selected network appliance. The packet size 124 in an echo request packet 110 may alternatively match, for example, a preferred packet size 128 for a video codec in a selected network appliance. Or, the packet size 124 in an echo request packet 110 may match, for example, a preferred packet size 130 for a Web Real Time Communications (WebRTC) codec in a selected network appliance.

Some method steps may be carried out in a different order than described in the preceding examples. Such variations will be understood by a person of ordinary skill in the art to be within the scope of the disclosed embodiments.

What is claimed is:

1. A method for measuring a quality of service in an Internet protocol network, comprising:
    forming an echo request packet in an originating device;
    transmitting the echo request packet to a destination device through the Internet protocol network communicatively coupling the originating device to the destination device;
    receiving the echo request packet at the destination device;
    modifying the received echo request packet in the destination device by swapping a source address and a destination address in the received echo request packet without allocating memory in the destination device for another data packet to form an echo reply packet;
    receiving the echo reply packet at the originating device;
    in the originating device, comparing a Differentiated Services Code Point (DSCP) value in the echo request packet to the DSCP value in the echo reply packet; and
    when the DSCP value in the echo request packet is equal to the DSCP value in the echo reply packet, asserting that Differential Service is preserved in the Internet protocol network from the originating device to the destination device.

2. The method of claim 1, further comprising identifying a network appliance in the Internet protocol network where the DSCP value is not preserved.

3. The method of claim 1, further comprising transmitting no more than one echo request packet from the originating device to the destination device to determine that Differential Service is preserved.

4. The method of claim 1, further comprising forming no more than one echo request packet in the origination device to determine that Differential Service is preserved.

5. The method of claim 1, further comprising asserting that the Internet protocol network operates with a preferred quality of service for a streaming message service.

6. The method of claim 1, further comprising asserting that Differential Service is not preserved in the Internet protocol network when a value for DSCP in the echo request packet is not equal to a value for DSCP in the echo reply packet.

7. The method of claim 6, further comprising asserting that the Internet protocol network is not operating with a preferred quality of service for a streaming message service.

8. The method of claim 1, further comprising predicting a preferred quality of service for messages representative of Voice Over Internet Protocol.

9. The method of claim 1, further comprising predicting a preferred quality of service for messages representative of streaming audio.

10. The method of claim 1, further comprising predicting a preferred quality of service for messages representative of streaming video.

11. The method of claim 1, further comprising predicting a preferred quality of service for messages representative of control of an industrial process.

12. The method of claim 1, further comprising predicting a preferred quality of service for messages representative of video on demand.

13. The method of claim 1, further comprising providing an estimate of QOS for a congested Internet protocol network by sending a plurality of untagged packets with a DSCP tagged packet.

14. The method of claim 1, further comprising assigning a nonzero DSCP value to the echo request packet.

15. The method of claim 1, further comprising assigning a packet size value to the echo request packet that matches a preferred packet size for a VoIP codec in a selected network appliance.

16. The method of claim 1, further comprising assigning a packet size value to the echo request packet that matches a preferred packet size for a video codec in a selected network appliance.

17. The method of claim 1, further comprising assigning a packet size value to the echo request packet that matches a preferred packet size for a Web Real Time Communications (WebRTC) codec in a selected network appliance.

18. A method for measuring a quality of service in an Internet protocol network, comprising:
  forming a first echo request packet and a second echo request packet in an originating device;
  assigning a first Differentiated Services Code Point (DSCP) value to the first echo request packet;
  assigning a second DSCP value assigned to the second echo request packet;
  sending the first and second echo request packets from the originating device to a destination device through the Internet protocol network;
  receiving the first and second echo request packets at the destination device;
  modifying the first echo request packet in the destination device to form a first echo reply packet by swapping a source address and a destination address in the first echo request packet, without allocating memory in the destination device for another data packet
  modifying the second echo request packet in the destination device to form a second echo reply packet by swapping a source address and a destination address in the second echo request packet, without allocating memory in the destination device for another data packet;
  receiving the first and second echo reply packets at the originating device;
  in the originating device:
    comparing a DSCP value in the first echo reply packet to a DSCP value in the second echo reply packet;
    comparing a DSCP value in the first echo request packet to the DSCP value in the first echo reply packet;
    when the DSCP value in the first echo request packet is equal to the DSCP value in the first echo reply packet, asserting that Differential Service is preserved in the Internet protocol network from the originating device to the destination device; and
    predicting a preferred quality of service for the Internet protocol network when the DSCP value in the first echo reply packet is equal to the DSCP value in the first echo request packet and the DSCP value in the second echo reply packet is equal to the DSCP value in the second echo request packet.

* * * * *